United States Patent Office 3,519,677
Patented July 7, 1970

1

3,519,677
ANTHRASTEROIDS AND PROCESS FOR
THEIR MANUFACTURE
Oskar Jeger, Zollikerberg, Bernhard Nann, Olten, and Kurt Schaffner, Zurich, Switzerland, assignors to Ciba Corporation, New York, N.Y., a corporation of Delaware
No Drawing. Filed Dec. 21, 1965, Ser. No. 515,455
Claims priority, application Switzerland, Jan. 21, 1965, 882/65; Sept. 28, 1965, 13,374/65
Int. Cl. C07c 49/44, 39/12, 69/00
U.S. Cl. 260—479                          7 Claims

ABSTRACT OF THE DISCLOSURE

Anthrasteroids of the general formula (I)

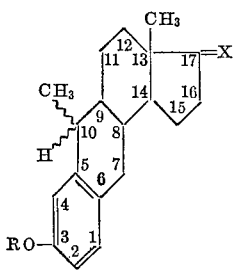

where RO represents a free, esterified or etherified hydroxyl group and X stands for any substituent occurring in position 17 of normal steroids—and a process for their manufacture. The aforementioned compounds have an oestrogenic, hypocholesterolaemic and hypophysis-inhibiting action and may be used, for example, for treating artheriosclerosis or deficiency symptoms of the menopause.

The present invention provides new anthrasteroids of the general formula

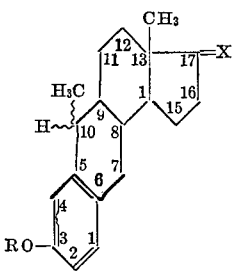

where RO represents a free, esterified or etherified hydroxyl group and X stands for any substituent occurring in position 17 of normal steroids—and a process for their manufacture.

The afore-mentioned compounds constitute a new type of biologically active steroid analogues or intermediates for their manufacture. They have an oestrogenic, hypocholesterolaemic and hypophysis-inhibiting action and may be used, for example, for treating artheriosclerosis or deficiency symptoms of the menopause.

2

Particularly valuable are compounds of the formulae

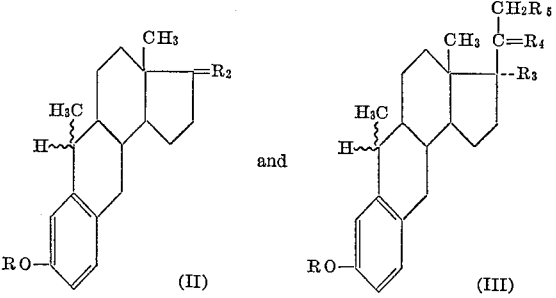

where RO has the above meaning, $R_2$ stands for an oxo group, or a free, esterified or etherified β-positioned hydroxyl group and a hydrogen atom or a lower aliphatic hydrocarbon residue, $R_3$ for a hydrogen atom, or a lower alkyl radical or a free, esterified or etherified hydroxyl group, $R_4$ for a free or ketalized oxo group, or a hydrogen atom and a free, esterified or etherified hydroxyl group, and $R_5$ represents a hydrogen atom or a free, esterified or etherified hydroxyl group—and their tautomers.

Particularly valuable biological properties are found in compounds of the Formula II where R represents a hydrogen atom or a lower alkyl or aliphatic carboxylic acid residue and $R_2$ a keto group, or a free hydroxyl group or a hydroxyl group esterified with a lower aliphatic carboxylic acid, together with a hydrogen atom or a lower alkyl such as methyl or ethyl radical, a lower alkenyl such as vinyl, allyl or methallyl residue, or a lower alkinyl such as ethinyl or propinyl residue. Special mention deserve the following $\Delta^{1,3,5}$-anthrasteroid-trienes:

$\Delta^{1,3,5}$-3 - hydroxy - 17β-hydroxyanthrastatriene and its esters and ethers, for example its 3-methyl ether; $\Delta^{1,3,5}$-3-hydroxy-17-oxo-anthrastatriene and its esters and ethers; $\Delta^{1,3,5}$-3-hydroxy-17β-hydroxy-17α-methyl-, -17α - ethyl-, -17α-allyl and -17α-allyl and -17α-ethinyl-anthrastatrienes, their esters and ethers, for example the 3-methyl ethers.

The acid residues of the above esters are especially those of aliphatic, cycloaliphatic, araliphatic, aromatic or heterocyclic carboxylic acids containing 1 to 15 carbon atoms, for example the formates, acetates, propionates, butyrates, trimethylacetates, caproates, valerates, decanoates, cyclopentylpropionates, tetrahydrobenzoates, phenylpropionates, benzoates, furoates, trifluoroacetates, ethylcarbonates, methylcarbonates or the like.

When the final product obtained is an anthrasteroid-1,3-5-triene that contains in position 17 the side chain of the cholane, cholestane, spirostane or cardanolide series it may, if desired, be converted by a known method into the pharmacologically very potent androstane or pregnane derivatives, for example by the acylolytic, oxidative and/or microbiological route.

The new pharmacologically active compounds can be used as medicaments in human and veterinary medicine, for example in the form of pharmaceutical preparations which contain the new compounds in admixture or conjunction with an organic or inorganic, solid or liquid pharmaceutical excipient suitable for enteral, for example oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semi-liquid form solutions, suspensions, emulsions, ointments or creams. They may be sterilized and/or contain auxiliaries such as preserving, stabilizing, wetting or emulsifying agents, salts for regulating the osmotic pressure or buffers. They may also contain further therapeutically valuable substances. The preparations are formulates in known manner.

The new compounds are obtained when $\Delta^{1,5(6)}$-3-oxosteriods that do not contain a further free oxo group, are irradiated with ultraviolet light in a neutral medium, the irradiation product is treated with a basic agent, from the resulting mixture the phenolic phase is isolated and, if desired, any acetal groups present in a resulting $\Delta^{1,3,5}$-3-hydroxyanthrasteroid-triene are liberated, ether or ester groups present are hydrolyzed to form free hydroxyl groups and/or free hydroxyl groups present are esterified, etherified or oxidized.

The present process is represented, for example, by the following partial scheme of formulae:

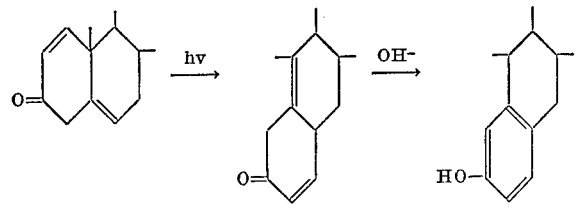

The $\Delta^{1,5(6)}$-3-oxosteroids used as starting materials are known, or, if new, they can be prepared by known methods, for example by treatment of a $\Delta^{1,4}$-3-oxosteroid that contains in position 6 a residue eliminable by reduction, such as a halogen atom or an acyloxy group, with a metallic reducing agent, for example zinc or a zinc alloy, copper or mercury, under weakly basic to weakly acidic conditions.

The irridation of the $\Delta^{1,5(6)}$-3-oxosteroids according to the present process is advantageously performed in an organic solvent, for example in an aliphatic and/or cycloaliphatic hydrocarbon, such as pentane, hexane, cyclohexane or methylcyclohexane, in an aliphatic or cyclic ether, such as diethylether or dioxane, or preferably in an alcohol, for example in rectified ethanol.

A suitable source of light is artificial light or strong daylight. Preferred use is made of ultraviolet light as emitted by a mercury vapour low-pressure or preferably high-pressure burner or strong sunshine. The irradiation is advantageously carried out at a temperature within the range from 0 to 80° C., advantageously under nitrogen in a quartz vessel in which the source of light is centrally disposed and cooled with water.

The reaction mixture obtained after the irradiation is then treated with a strong base, such as an alkali metal or alkaline earth metal hydroxide or carbonate, preferably at room temperature, whereupon the phenolic phase is isolated in known manner by basic extraction, or by chromatography on alumina or silicagel. Alternatively, the $\Delta^{1,3,5}$-3-hydroxy-anthrasteroid-trienes can be isolated from the reaction mixture by fractional recrystallization.

Any ester or protective groups, for example ketals, present in the resulting phenols, can be split hydrolytically and free hydroxyl groups can be oxidized to oxo groups. On the other hand, process products containing free hydroxyl groups can be converted in known manner into their esters or ethers, for example by acylation with carboxylic acid anhydrides or halides.

The $\Delta^{1,5(6)}$-3-oxosteroids used as starting materials in the present process, whose methyl group in position 10 may be α- or β-positioned, belong preferably to the series of the androstanes, preganes, cholanes, cholestanes, furostanes or cardanolides and may contain in addition to the afore-mentioned groupings further substituents, such as alkyl, for example methyl groups, halogen atoms, functionally modified oxo groups and/or free, esterified or etherified hydroxyl groups.

Particularly valuable starting materials are, for example, the following compounds:

$\Delta^{1,5}$ - 3-oxo-17β-hydroxyandrostadiene, $\Delta^{1,5}$-3-oxo-17β-hydroxy-17α-methyl-, -17α-ethyl-, -17α-allyl-, -17α-ethinyl- and -17α-propinyl-androstadienes and their esters, $\Delta^{1,5}$-3-oxo-17-ethylenedioxy-androstadiene, also $\Delta^{1,5}$-3-oxo-20-hydroxy-17α-methyl-, -17α-ethyl-, -17α-allyl-, -17α-ethinyl-dioxy-pregnadiene, $\Delta^{1,5}$ - 3-oxo-17α-hydroxy-20-ethylenedioxy-pregnadiene and $\Delta^{1,5}$-3-oxo-17α,20,20,21-bismethylenedioxy-pregnadiene.

The following examples illustrate the invention.

EXAMPLE 1

2 grams of $\Delta^{1,5(6)}$ - 3-oxo-17β-acetoxyandrostadiene in ½ litre of optically pure rectified ethanol are irradiated for 1 hour with a mercury vapour high-pressure burner. The reaction solution is then evaporated, 50 ml. of 50% potassium hydroxide solution in methanol are added to the residue and the batch is kept for 5 hours under nitrogen. The reaction solution is acidified with hydrochloric acid and extracted with ether, to furnish 1.754 g. of a mixture which is absorbed on silicagel (grain size below 0.08 mm.). A 4:1-mixture of benzene and ethyl acetate elutes from the column 212 mg. of $\Delta^{1,3,5}$-3,17β-dihydroxy-anthrastatriene which, after three recrystallizations from ether+hexane, melts at 172 to 173° C., optical rotation $[\alpha]_D = -58°$ (c.=0.5 in chloroform). Ultraviolet bands at 280 mμ ($\epsilon$=2200) and 288 mμ ($\epsilon$=2150). Infrared spectrum: bands at 3600, 1610 cm.$^{-1}$.

The identical product is obtained when $\Delta^{1,5(6)}$-3-oxo-17β-acetoxy-10α-androstadiene is used as starting material.

EXAMPLE 2

A solution of 136 mg. of $\Delta^{1,3,5}$ - 3,17β-dihydroxyanthrastatriene in 5 ml. of ethanol is mixed at the boil and under nitrogen at intervals of 10 minutes each time with 2 ml. of dimethyl sulphate and 50% potassium hydroxide solution in water until in all 10 ml. of dimethyl sulphate and of 10 ml. of potassium hydroxide solution have been added. The reaction mixture is then heated for a further hour at the boil, poured into water and extracted with ether. The ethereal solution is washed neutral, dried and evaporated, to yield 122 mg. of $\Delta^{1,3,5}$-3-methoxy-17β-hydroxy-anthrastatriene which, after three recrystallizations from acetone+hexane, melts at 101 to 102° C. Optical rotation $[\alpha]_D = -58°$ (c.=0.9 in chloroform). Ultraviolet bands at 280 mμ ($\epsilon$=2450) and 288 mμ ($\epsilon$=2300).

EXAMPLE 3

A solution of 100 mg. of $\Delta^{1,3,5}$ - 3,17β-dihydroxyanthrastatriene in 0.5 ml. of pyridine is mixed with 0.5 ml. of acetic anhydride and then kept for 18 hours at 20° C. Usual working up furnishes a crude product from which after two recrystallizations from acetone+hexane pure $\Delta^{1,3,5}$-3,17β-diacetoxyanthrastatriene melting at 98 to 99° C. is obtained. Optical rotation $[\alpha]_D^{25} = -65°$ (c.=0.85 in chloroform). Ultraviolet bands at 269 mμ ($\epsilon$=760) and 277 mμ ($\epsilon$=910). Infrared bands at 1750, 1720, 1610 and 1250 cm.$^{-1}$.

EXAMPLE 4

8 N chromium trioxide solution in 8 N sulphuric acid is dropped into a solution of 98 mg. of $\Delta^{1,3,5}$-3-methoxy-17β-hydroxyanthrastatriene in 5 ml. of acetone until the red coloration of the whole persists; it is then kept for 30 minutes at room temperature and worked up in the usual manner. The crude product is absorbed on silicagel and eluted with a 4:1-mixture of benzene and ethyl acetate. The eluate is evaporated and the crude product sublimed under vacuum. The resulting $\Delta^{1,3,5}$ - 3-methoxy-17-oxo-anthrastatriene melts at 142 to 144° C. Ultraviolet bands at 288 m$\mu$ ($\epsilon$=2400) and 281 m$\mu$ ($\epsilon$=2600). Infrared bands at 1730, 1710 and 1580 cm.$^{-1}$.

When a mixture of $\Delta^{1,3,5}$-3-methoxy-17-oxoanthrastatriene, hydrobromic acid and acetic anhydride is refluxed for 4 hours, and the reaction mixture is worked up in the usual manner, $\Delta^{1,3,5}$-3-hydroxy-17-oxoanthrastatriene is obtained which displays in the infrared spectrum bands at 3600, 1730, 1610 and 1575 cm.$^{-1}$.

What is claimed is:
1. $\Delta^{1,3,5}$-3,17$\beta$-dihydroxy-anthrastatriene.
2. $\Delta^{1,3,5}$-3-methoxy-17$\beta$-hydroxy-anthrastatriene.
3. $\Delta^{,3,5}$-3,17$\beta$-diacetoxy-anthrastatriene.
4. $\Delta^{1,3,5}$-3 - hydroxy-17-oxo-anthrastatriene and its 3-methyl ether.
5. A process for the manufacture of anthrasteroids, wherein $\Delta^{1,5(6)}$-3-oxo-steroids that do not contain a further free oxo group, are irridiated with ultraviolet light in a neutral medium, a basic agent is added to the irradiation product and from the resulting mixture the phenolic compounds are isolated.
6. A process as claimed in claim 5, wherein the $\Delta^{1,5(6)}$-3-oxosteroids are irradiated in an organic solvent.
7. A process as claimed in claim 5, wherein the irradiation is carried out with a mercury high-pressure burner.

References Cited

Djerassi et al.: JACS. vol. 73, pp. 1523–1527, April 1951.

LEON ZITVER, Primary Examiner

N. P. MORGENSTERN, Assistant Examiner

U.S. Cl. X.R.

260—590, 619, 999; 424—311, 331, 340, 346; 260—488, 613; 204—158